US012585647B2

(12) United States Patent
Bensberg et al.

(10) Patent No.: US 12,585,647 B2
(45) Date of Patent: Mar. 24, 2026

(54) QUERY EXECUTION SYSTEM WITH PLAN REUSE

(71) Applicant: SAP SE, Walldorf (DE)

(72) Inventors: Christian Bensberg, Heidelberg (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/746,516

(22) Filed: Jun. 18, 2024

(65) Prior Publication Data

US 2025/0384034 A1      Dec. 18, 2025

(51) Int. Cl.
*G06F 16/2452*      (2019.01)
*G06F 16/2453*      (2019.01)

(52) U.S. Cl.
CPC .. *G06F 16/24524* (2019.01); *G06F 16/24549* (2019.01)

(58) Field of Classification Search
CPC ..................... G06F 16/24524; G06F 16/24549
See application file for complete search history.

(56) References Cited

U.S. PATENT DOCUMENTS

| | | | | |
|---|---|---|---|---|
| 11,314,740 | B1 * | 4/2022 | Hwang | G06F 11/3419 |
| 12,229,642 | B2 * | 2/2025 | Dirac | G06N 20/00 |
| 12,248,484 | B2 * | 3/2025 | Pal | G06F 16/24549 |
| 2008/0086444 | A1 * | 4/2008 | Yu | G06F 16/2455 |
| 2013/0247207 | A1 * | 9/2013 | Hugard, IV | G06F 21/57 |
| | | | | 726/25 |
| 2020/0050607 | A1 * | 2/2020 | Pal | G06F 16/2471 |
| 2021/0191942 | A1 * | 6/2021 | Arnold | G06F 16/24553 |
| 2022/0245148 | A1 * | 8/2022 | Hwang | G06F 11/3419 |

* cited by examiner

*Primary Examiner* — Angelica Ruiz

(74) *Attorney, Agent, or Firm* — Sterne, Kessler, Goldstein & Fox P.L.L.C.

(57)      ABSTRACT

System, method, and various embodiments for a query execution system with plan reuse are described herein. An embodiment operates by receiving a query on a database, the received query comprising one or more constants. Normalization is performed on the query, replacing the one or more constants with a variable-indicator. The normalized query is compared to one or more previously executed queries to identify a matching query. A matching execution plan corresponding to the matching query is selected. The matching execution plan is executed, for which the one or more constants are provided as runtime variables. A result from the execution of the matching execution plan is generated and returned.

20 Claims, 5 Drawing Sheets

400

Figure 2:
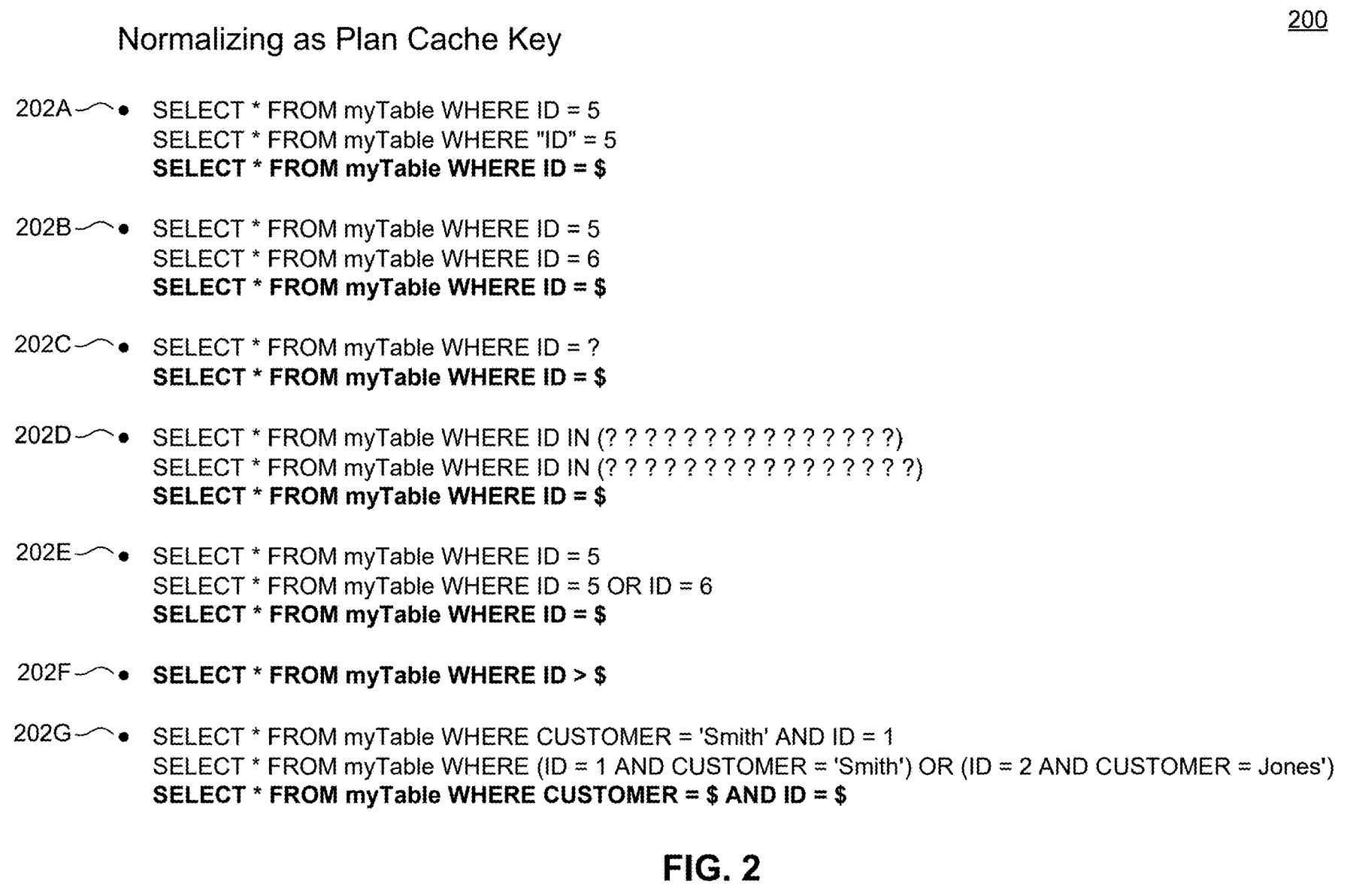

200

Normalizing as Plan Cache Key

202A
- SELECT * FROM myTable WHERE ID = 5
- SELECT * FROM myTable WHERE "ID" = 5
- **SELECT * FROM myTable WHERE ID = $**

202B
- SELECT * FROM myTable WHERE ID = 5
- SELECT * FROM myTable WHERE ID = 6
- **SELECT * FROM myTable WHERE ID = $**

202C
- SELECT * FROM myTable WHERE ID = ?
- **SELECT * FROM myTable WHERE ID = $**

202D
- SELECT * FROM myTable WHERE ID IN (? ? ? ? ? ? ? ? ? ? ?)
- SELECT * FROM myTable WHERE ID IN (? ? ? ? ? ? ? ? ? ? ? ? ?)
- **SELECT * FROM myTable WHERE ID = $**

202E
- SELECT * FROM myTable WHERE ID = 5
- SELECT * FROM myTable WHERE ID = 5 OR ID = 6
- **SELECT * FROM myTable WHERE ID = $**

202F
- **SELECT * FROM myTable WHERE ID > $**

202G
- SELECT * FROM myTable WHERE CUSTOMER = 'Smith' AND ID = 1
- SELECT * FROM myTable WHERE (ID = 1 AND CUSTOMER = 'Smith') OR (ID = 2 AND CUSTOMER = Jones')
- **SELECT * FROM myTable WHERE CUSTOMER = $ AND ID = $**

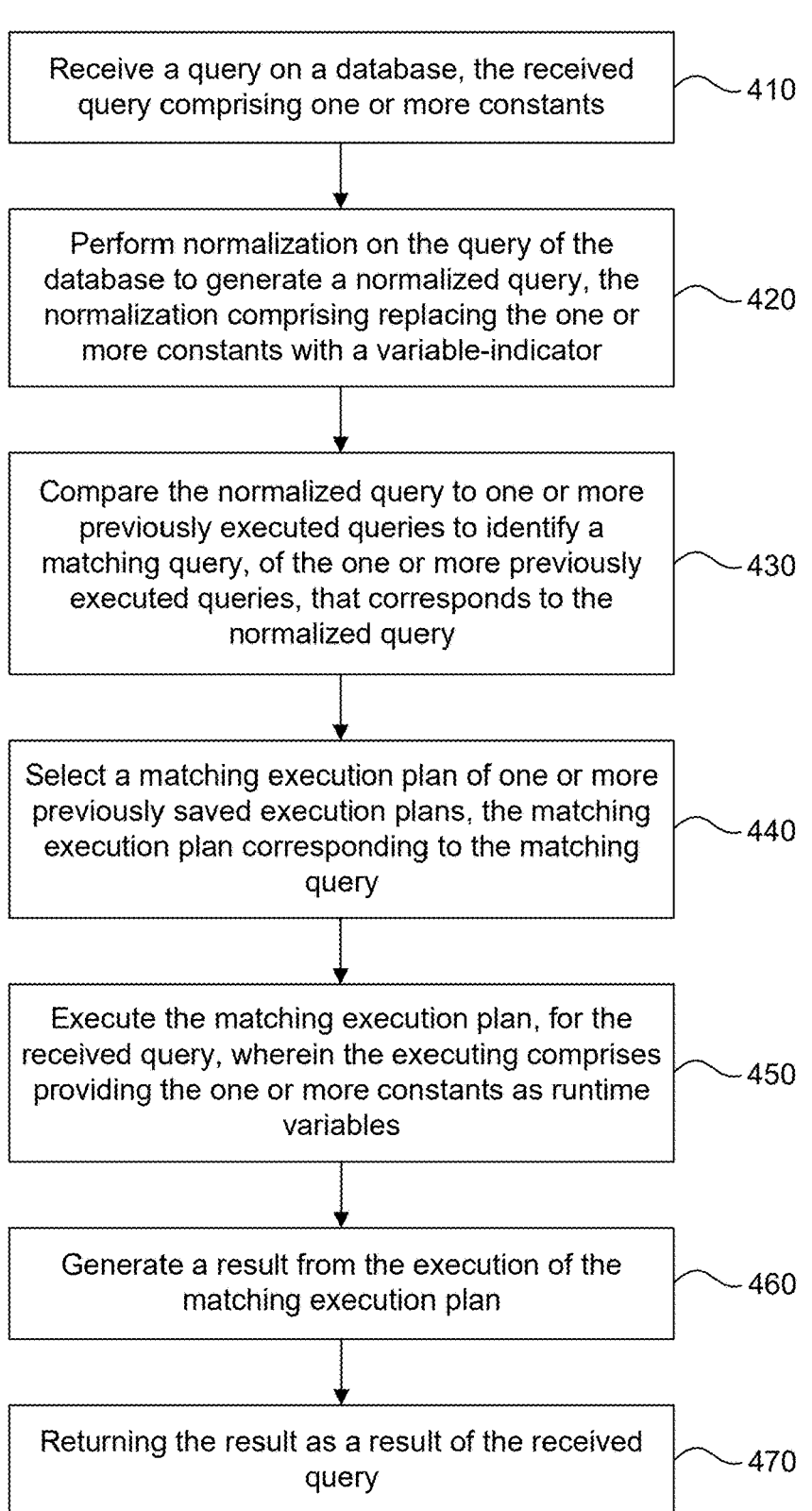

Receive a query on a database, the received query comprising one or more constants — 410

Perform normalization on the query of the database to generate a normalized query, the normalization comprising replacing the one or more constants with a variable-indicator — 420

Compare the normalized query to one or more previously executed queries to identify a matching query, of the one or more previously executed queries, that corresponds to the normalized query — 430

Select a matching execution plan of one or more previously saved execution plans, the matching execution plan corresponding to the matching query — 440

Execute the matching execution plan, for the received query, wherein the executing comprises providing the one or more constants as runtime variables — 450

Generate a result from the execution of the matching execution plan — 460

Returning the result as a result of the received query — 470

FIG. 4

Computer System 500

QUERY EXECUTION SYSTEM WITH PLAN REUSE

BACKGROUND

Database systems execute queries as part of serving their clients. Some database systems can execute upwards of a billion queries per day, as such, query execution is an important aspect of managing a database. However, query execution can be time and resource consuming because each new query often needs to be broken down into executable statements that can actually be understood and processed by the database system. However, performing this query breakdown for each new query is inefficient, particularly if multiple similar queries are received and each one needs to be individually broken down as a unique query prior to execution.

BRIEF DESCRIPTION OF THE DRAWINGS

The accompanying drawings are incorporated herein and form a part of the specification.

FIG. 2 illustrates various examples of normalizing queries through the application of various normalization rules, according to some example embodiments.

FIG. 4 is a flowchart illustrating example operations for providing a query execution system (QES) 102, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a query execution system with plan reuse.

Database systems execute queries as part of serving their clients. Some database systems can execute upwards of a billion queries per day, as such, query execution is an important aspect of managing a database. However, query execution can be time and resource consuming because each new query often needs to be broken down into executable statements that can actually be understood and processed by the database system. However, performing this query breakdown for each new query is inefficient, particularly if multiple similar queries are received and each one needs to be individually broken down as a unique query prior to execution.

Figure 1:
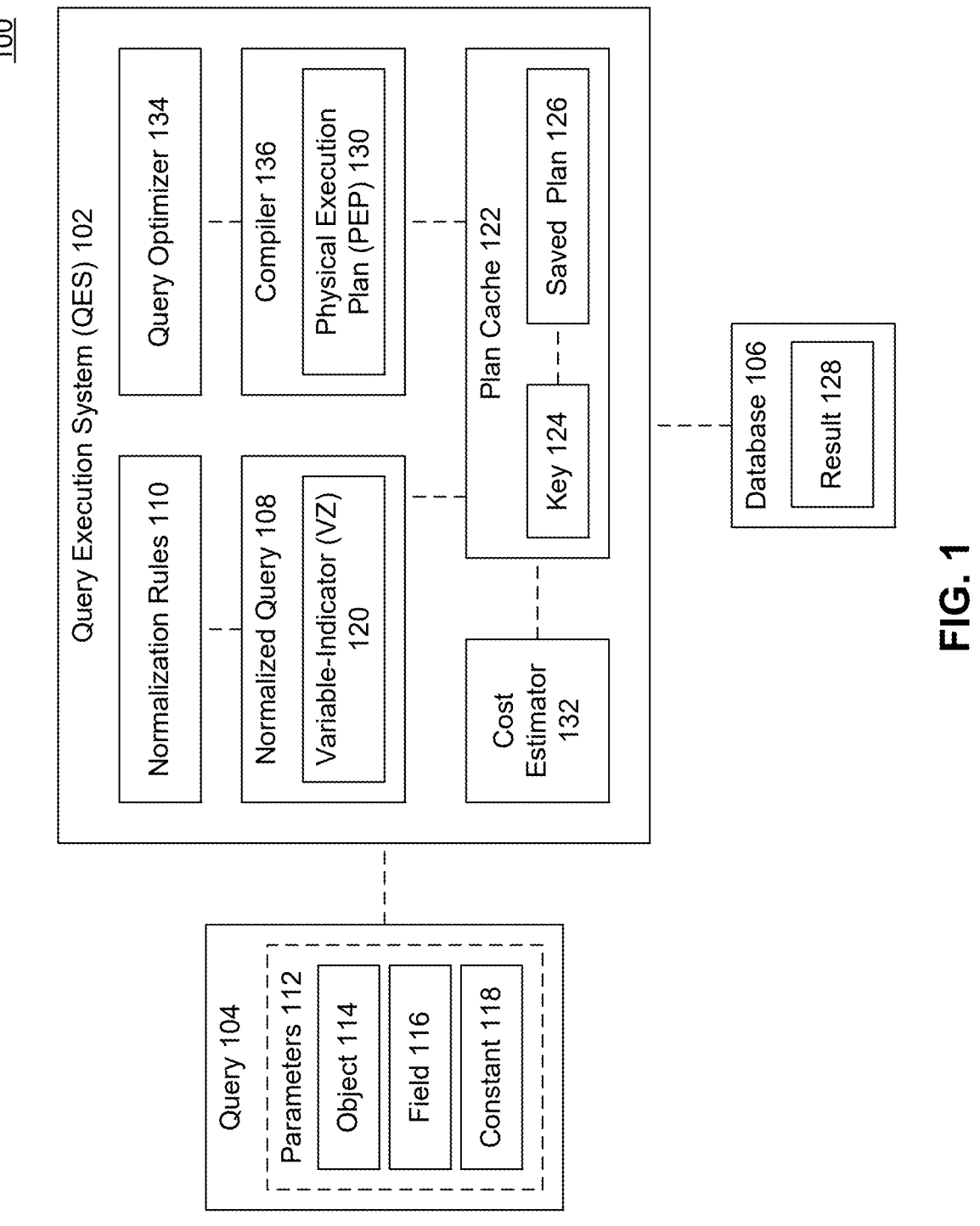
FIG. 1 is a block diagram illustrating example functionality for a query execution system (QES), according to some embodiments.

FIG. 1 is a block diagram 100 illustrating example functionality for a query execution system (QES) 102, according to some embodiments. QES 102 may optimize the execution of a query 104, through normalization and plan reuse. Conventionally, when a first query is received by a database system, the first query must be broken down into a query execution plan and then the query execution plan is actually executed. If a second query is then received, and the second query is different from the first query in any way, a new query execution plan must be generated for the second query and then executed.

In contrast to conventional processing, QES 102 may compare a current query 104 to previously processed queries (for which execution plans have been previously generated and saved), and allow for the reuse of a previously generated execution plan for different queries if there are enough similarities between the current query and a previously executed query. This reuse saves valuable computing processing resources and time by avoiding breaking down the query into an execution plan and compiling the plan, when there is already a previously compiled plan that could be used. This reuse increases system throughput and provides for faster query processing. Additionally, storage space necessary for storing query execution plans is reduced because multiple similar or identical plans are not saved in a plan cache 122. And fewer plans further results in faster processing.

QES 102 may receive a query 104. Query 104 may include any request for information from a database 106, for any reason (e.g., read, write, edit, etc.). In some embodiments, query 104 may be received as a structured query language (SQL) statement. In some embodiments, QES 102 may generate a normalized query 108 from the received query 104. In some embodiments, normalized query 108 may include a revised version of query 104 generated based on the application of a set of normalization rules 110. This normalization of a received query 104, in accordance with normalization rules 110 (referred to herein generally as rules 110) may provide for greater reuse of query execution plans.

Rules 110 may include various processes or transformations which may be applied by QES 102 to modify the query 104, prior to processing by database 106, and generate a normalized version of the query 104. In some embodiments, query 104 may include various parameters 112, and different rules 110 may be applied to different parameters 112. Some example query parameters 112 include, but are not limited to, an object 114, field 116, and constant 118. In other embodiments, a query 104 may include different parameters 112 other than those described herein. The parameters 112 and rules 110 described herein are provided for exemplary purposes only, it is understood that in other embodiments, parameters 112 and/or rules 110 may vary from the examples provided herein.

Object 114 may refer to which database object(s) are referenced in the query 104. Example database objects 114 include, a table, index, and view. In some embodiments, the object 114 may refer to any data structure of database 106 that stores or organizes one or more records. Field 116 may indicate which column(s) or record(s) of the object 114 is being referred to or requested in the query 104. In some embodiments, field 116 may refer to one or more column names. Constant 118 may refer to one or more values included in the query 104. Example constants 118 may include one or more alphanumeric values that are being searched for in the field 116. In the example query: SELECT*FROM myTable WHERE ID=5, "myTable" may be an object 114, "ID" may be a field 116, and "5" may be a constant 118.

Various example rules 110 are described herein. However it is understood that the rules 110 provided are only exemplary, and are normalization rules 110 are not limited thereto. A rule 110 may include normalizing the white space between different values of query 104, (e.g., using one (white) space character between different values). A rule 110 may include capitalizing all the letters of all the words in a query 104. A rule 110 may include identifying if there are multiple OR statements in the query 104, and collapsing them to a single OR statement. A rule 110 may include identifying any AND statements, and organizing the fields 116 joined by the AND statement, alphabetically, or in another sorted order. QES 102 may apply any selection of applicable normalization rules 110 to a query 104.

In some embodiments, a rule 110 may include replacing constants 118 with a variable-indicator (VI) 120. VI 120 may include any character or group of characters that are used to indicate a constant 118 existed in the original or received query 104 (e.g., prior to normalization). In the examples provided herein, the $ is used as VI 120, however in other embodiments, other alphanumeric characters or symbols may be used as VI 120.

In some embodiments, VI 120 may be a placeholder for a constant 118. Then, for example, during run-time or execution of a query plan associated with the query 104, the actual values for the constants 118 may be provided back to replace VI 120 during execution of the normalized query 108, to generate a result 128.

FIG. 2 illustrates various examples of normalizing queries 104 through the application of various normalization rules 110, according to some example embodiments. FIG. 2 illustrates various query groups 202A-G illustrating how QES 102 may process different received queries 104, in accordance with normalization rules 110, and generate identical normalized queries 108. As will be discussed in greater detail below, these normalized queries 108 may then be used to identify if a previously generated execution plan which may then reused for the received query 104 corresponding to the normalized query.

In query group 202A, rules 110 may provide from stripping away the quotation marks from the field 116, and provide for replacing any constants 118 with a VI 120 of $. The application of these rules to the first two received queries, may result in an identical normalized query (which is bolded) for the two different received queries.

In a conventional system, each of the first two queries in group 202A would require separately generated execution plans because they are different queries. However, QES 102, through the application of normalization rules 110 may use the same execution plan for both queries, because both queries result in the same normalized query 108, thus minimizing the time and computing resources required prior to query execution. QES 102 avoids generating a second execution plan for the queries because the differences between the queries does not affect the execution of the queries in any substantive way, and QES 102 has normalized the typographical differences out of the queries in accordance with rules 110. In some embodiments, the value for the constant "5" (replaced by $ in the normalized query) may be provided back as a runtime variable when executing the normalized query of group 202A.

Query group 202B illustrates how the rule 110 to replace constants 118 (5 and 6) with a VI 120 ($), can generate same normalized query for different received queries with different values being searched, thus these queries may share the same query or physical execution plan. The values 5 and 6 may be provided back during execution of the execution plan corresponding to the bolded normalized query for query group 202B.

Query groups 202A-E illustrate how nine different queries could be normalized into a singular normalized query 108 through the application of normalization rules 110, and thus could share the same physical execution plan with the use of runtime variables. By contrast, in a conventional set up, processing these nine different queries would require the generation and compilation of nine different execution plans for the nine unique queries, even though the differences may be typographical.

Query groups 202C and 202D may be examples of prepared statements which are received as queries 104. Query groups 202C and 202D illustrates how a ? or group of ? can be categorized as a constant 118 and replaced with a single VI 120. Query group 202E illustrates that an OR statement between two constants can be collapsed into a single constant 118, and replaced with a VI 120. Then, during runtime, the original constants "ID=5 OR ID=6" may be provided back as runtime variables in executing the normalized query.

Query group 202F illustrates that changing the value marker from a = to > may require a new execution plan (e.g., relative to query groups 202A-E), even if other aspects of the normalized query are the same.

Query group 202G illustrates that an OR statement can be collapsed into a single constant 118, and how different fields 116 for an AND statement may be alphabetized for normalization. The query group 202G may have its own query execution plan relative to the other query groups 202A-F.

Figure 3:
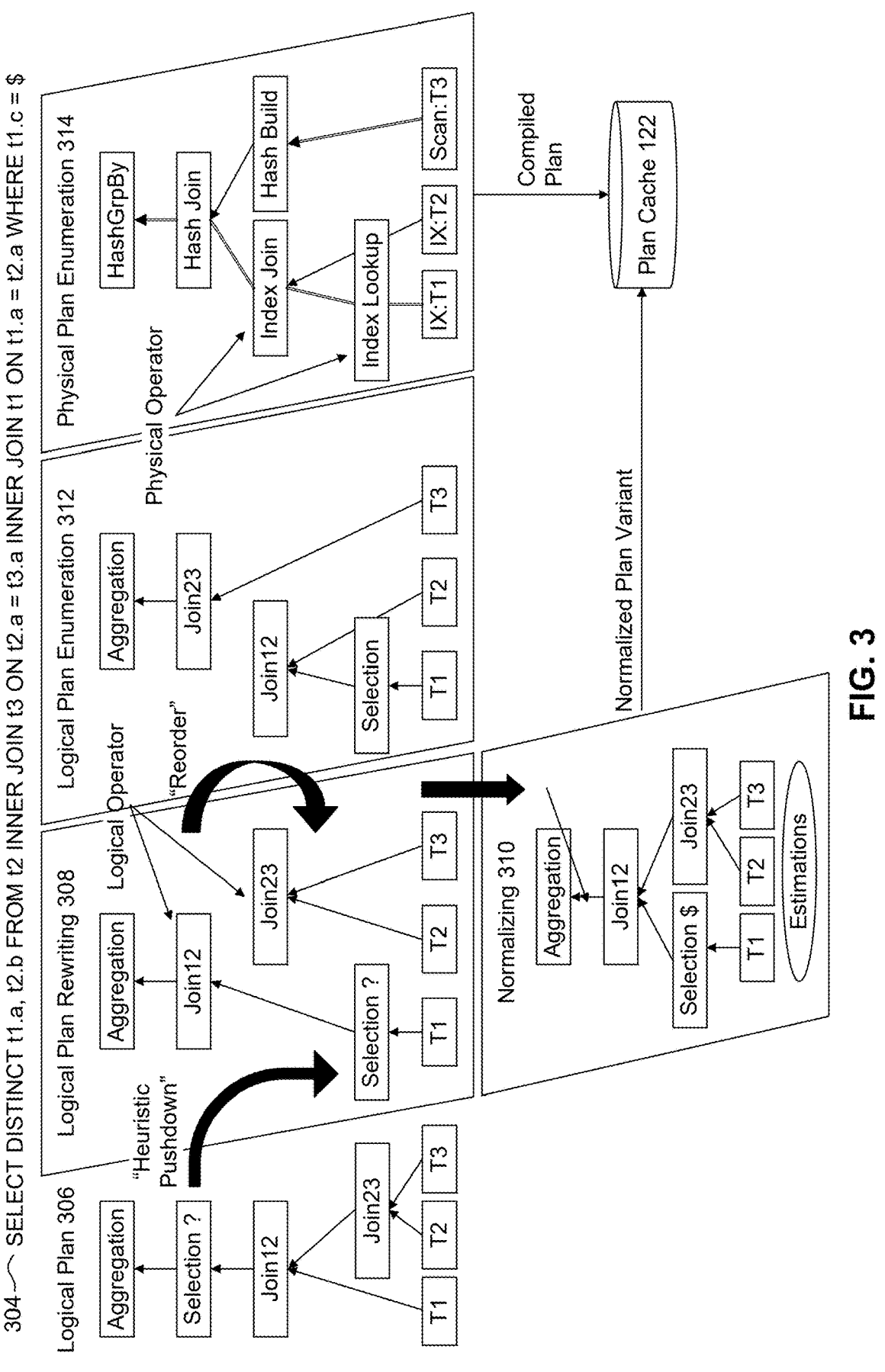
FIG. 3 illustrates example operations related to query processing with plan reuse, according to some embodiments.

FIG. 3 illustrates example operations related to query processing with plan reuse, according to some embodiments. QES 102 may receive a query 304. In some embodiments, QES 102 may generate a logical plan 306 from the query 304. Logical plan 306 may include a mapping of the query 304 into logical components prior to processing.

In some embodiments, QES 102 may then rewrite the logical plan 306 of the query 304 to improve processing, as a rewritten logical plan 308. In the example illustrated, the selection step may be pushed down to later in the processing, and the join commands may be reordered. As will be discussed in greater detail below, the changes performed during logical plan rewriting may be based on historical performances of query execution as stored or predicted by a size estimator 132.

In some embodiments, from the rewritten logical plan 308, QES 102 may perform normalization to generate a normalized query 310, in a manner described above. In other embodiments, the normalized query 310 may be generated from the logical plan 306 (e.g., without logical plan rewriting 308). The normalized query 310 may be provided to a plan cache 122 to determine whether a saved plan 126 may be reused, or whether a new plan is to be generated.

Returning to FIG. 1, plan cache 122 may receive a normalized query 108 and compare the normalized query 108 to one or more keys 124 saved in plan cache 122. Each key 124 may correspond to a previously generated normalized query 108 for which a corresponding saved plan 126 (e.g., saved query execution plan or physical execution plan 130) was previously generated and/or compiled. In some embodiments, a hash table may be used.

If the normalized query 108 matches (e.g., is identical to) a key 124 from plan cache 122, then the saved plan 126 corresponding to that key 124 may be used to execute the query 104 against the database 106 to generate a result 128. In this execution, any constants 118 may be provided back as run-time variables. This avoids the creation of a new physical execution plan (PEP) 130.

If, however, the normalized query 108 does not match any of the keys 124, then a new physical execution plan (PEP) 130 may be generated. In some embodiments, the comparison process (between the normalized query 108 and the keys 124) may include comparing the objects 114 and fields 116 between the normalized query 108 to the keys 124, and if those are similar, then performing more detailed analysis or comparison.

In generating a new PEP 130, a query optimizer 134 may perform logical plan enumeration 312 and physical plan enumeration 314 to generate the PEP 130. As illustrated in FIG. 3, performing the logical plan enumeration 312 may include performing additional reordering or other modifications to the rewritten logical plan, and performing the physical plan enumeration 314 may include mapping the various logical components to their physical locations on disk or memory. Then, for example, as illustrated in FIG. 1, a compiler 136 may compile the PEP 130. As illustrated in FIG. 3, the compiled plan may be provided to plan cache 122 and stored as a new saved plan 126 with a key 124 corresponding to the normalized query 108.

This compiled plan may be executed by or against database 106 to generate a result 128 of the query, which may be provided back to the requesting user or system.

In some embodiments, even if the normalized query 108 matches a key 124 in the plan cache additional processing may be performed to determine whether the saved plan 126 is suitable for reuse. For example, in the normalized query box 310, there are estimations that may be used. These estimations, which may be derived from the size estimator 132 may estimate a cost (e.g., in computing cycles or other computing resources) for performing the various actions and activities of the normalized query 108. The estimations may account for the actual constants 118 that were used in the original query 108 (e.g., as opposed to the VI 120 of the normalized query 108). In some embodiments, the size estimation or cost estimation and comparison may include performing a selectivity analysis, which may include or account for row counts, hits, values and using other statistics.

In some embodiments, the size estimator 132 may use a size estimation/output cardinality to determine, calculate, or estimate the cost of individual filtering operations of the normalized query 108. The QES 102 may compare the estimates to decide whether to re-use an existing physical plan (e.g., if output cardinalities are similar enough), or not re-use an existing physical plan and instead generate a new physical plan.

For example, if the cost or size estimations of the normalized query 108 fall within a range of cost or selectivity for the corresponding key 124, then the saved plan 126 may be reused as is. If, however, the cost estimations of the normalized query 108 fall outside the range of cost for the corresponding key 124, then a new PEP 130 may be generated and compiled, or the existing saved plan 126 may be recompiled.

In the normalized query box 310, there are estimations (size and/or cost) that may be used. These estimations, which may be derived from the size estimator 132 may estimate a cost in terms of output cardinality of a certain filter operation of the normalized query 108. The estimations may account for the actual constants 118 that were used in the original query 108 (e.g., as opposed to the VI 120 of the normalized query 108). In some embodiments, the size estimation and comparison may include performing a selectivity analysis, which may include or account for row counts, hits, values and using other statistics.

If the cost estimations of the normalized query 108 fall within a range of cost or selectivity for the corresponding key 124, then the saved plan 126 may be reused as is. If, however, the cost estimations of the normalized query 108 fall outside the range of cost for the corresponding key 124, then a new PEP 130 may be generated and compiled.

In some embodiments, if QES 102 concludes to compile a new PEP 130, QES 102 may skip step 308 (rule based/heuristic query rewriting, which is independent of any selectivities or estimations), because the saved normalized query plan (310) can be reused and thus the processing can directly jump to logical plan enumeration (312).

FIG. 4 is a flowchart 400 illustrating example operations for providing a query execution system (QES) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIG. 1.

In 410, a query is received on a database, the received query comprising one or more constants. For example, QES 102 may receive query 104 intended to be processed on database 106, the query 104 may include parameters 112 including one or more constants 118.

In 420, normalization is performed on the query to generate a normalized query, the normalization comprising replacing the one or more constants with a variable-indicator. For example, QES 102 may modify query 104 in accordance with a set of normalization rules 110 to generate a normalized query 108. In some embodiments, the constants 118 of the query 104 may be replaced with a VI 120, as illustrated in the examples of FIG. 2.

In 430, the normalized query is compared to one or more previously executed queries to identify a matching query, of the one or more previously executed queries, that corresponds to the normalized query. For example, QES 102 may compare the normalized query 108 to the various keys 124 stored in plan cache 122 to determine if there is a match. For simplicity, on a single key 124 and corresponding saved plan 126 is illustrated, however it is understood that plan cache 122 may store any number of keys 124 and corresponding saved plans 126.

In 440, a matching execution plan of one or more previously saved execution plans is selected, the matching execution plan corresponding to the matching query. For example, QES 102 may determine that normalized query 108 matches or identical to key 124, and may select and retrieve the corresponding saved plan 126 for execution.

In 450, the matching execution plan is executed for the received query, wherein the executing comprises providing the one or more constants as runtime variables. For example, QES 102 may execute or provide saved plan 126 for execution against database 106, as part of the execution, the constants 118 may be provided back as runtime variables to replace any VIs 120 in normalized query 108.

In 460, a result from the execution of the matching execution plan. For example, the result of executing the saved plan 126 may be generating a result 128. The result 128 may include one or more records matching or satisfying the query 104.

In 470, the result is returned as a result of the received query. For example, QES 102 may provide the result 128 back to the requesting user or device for further processing.

Figure 5:
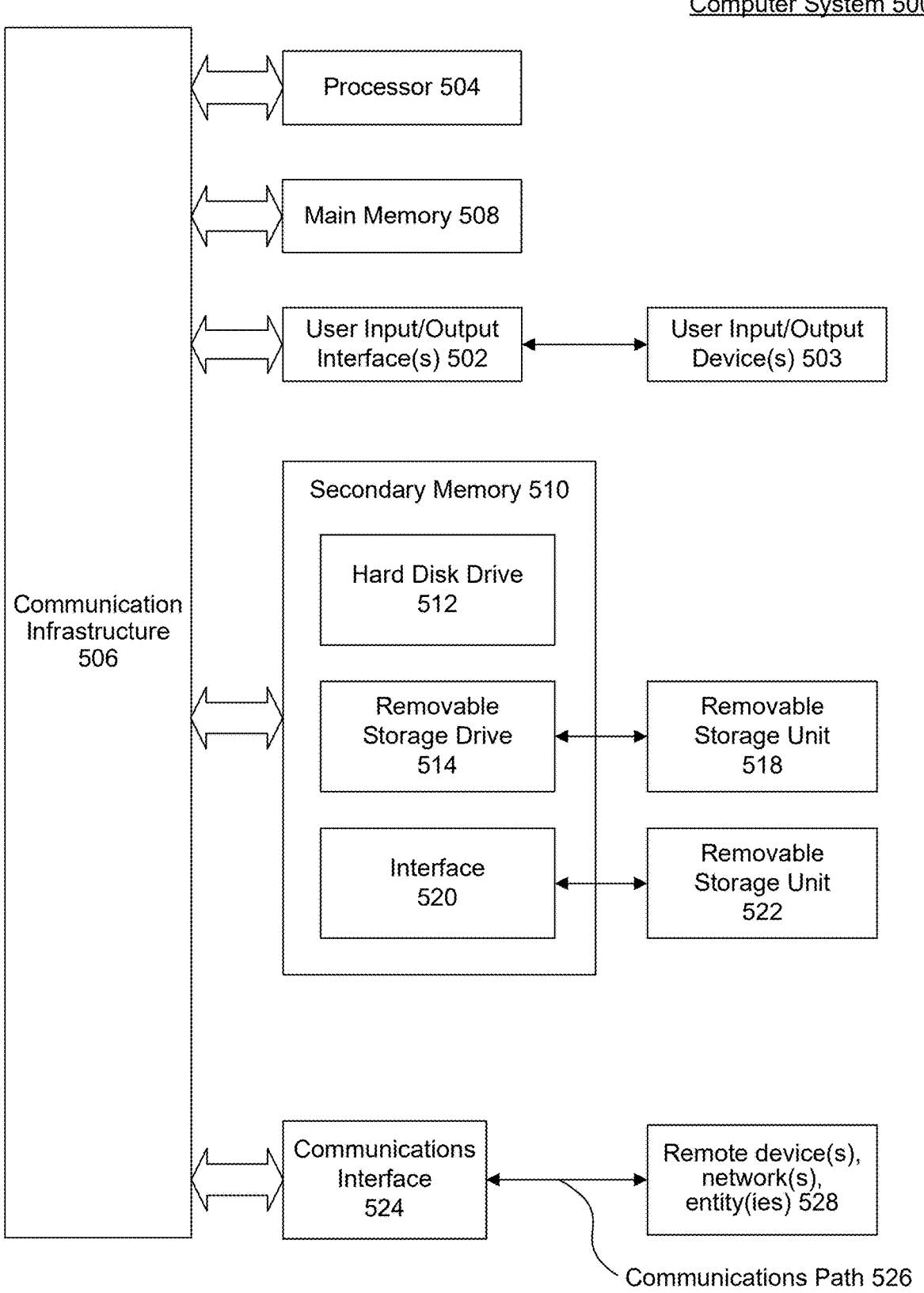
FIG. 5 is example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving a query on a database, the query comprising one or more first constants;
performing normalization on the query to generate a normalized query, the normalization comprising replacing the one or more first constants with a variable-indicator;
comparing the normalized query to one or more previously generated normalized queries to identify a matching query of the one or more previously generated normalized queries, wherein the matching query corresponds to a previously received query comprising one or more second constants;
selecting a matching execution plan of one or more previously saved execution plans, based on the matching execution plan corresponding to the matching query, wherein each of the one or more previously saved execution plans is pre-compiled;
executing the matching execution plan, for the query, on the database, wherein the executing comprises providing the one or more first constants as runtime variables;
generating a result from the execution of the matching execution plan; and
returning the result as a result of the query.

2. The computer-implemented method of claim 1, wherein the executing further comprises:

performing a selectivity comparison between the one or more second constants of the previously received query and the one or more first constants of the query;
determining that a first selectivity of the one or more first constants of the query fall within a range of a second selectivity of the one or more second constants of the previously received query; and
selecting the matching execution plan based on the determination.

3. The computer-implemented method of claim 1, wherein the executing further comprises:
performing a selectivity comparison between the one or more second constants of the previously received query and the one or more first constants of the query;
determining that a first selectivity of the one or more first constants of the query fall outside a range of a second selectivity of the one or more second constants of the previously received query;
recompiling the matching execution plan in view of the determination; and
executing the recompiled matching execution plan.

4. The computer-implemented method of claim 1, wherein the comparing comprises:
comparing a first table of the normalized query to a second table of the matching query to determine that the first table is identical to the second table.

5. The computer-implemented method of claim 4, further comprising:
comparing one or more first fields of the normalized query to one or more second fields of the matching query to determine that the one or more first fields are identical to the one or more second fields.

6. The computer-implemented method of claim 1, wherein the performing normalization comprises:
identifying an OR statement between a first value and a second value in the query;
removing the OR statement; and
replacing the first value and the second value with the variable-indicator.

7. The computer-implemented method of claim 1, wherein the performing normalization comprises:
identifying an AND statement between a first field and a second field in the query; and
sorting the first field and the second field alphabetically.

8. A system comprising:
a memory; and
at least one processor coupled to the memory and configured to perform operations comprising:
receiving a query on a database, the query comprising one or more first constants;
performing normalization on the query to generate a normalized query, the normalization comprising replacing the one or more first constants with a variable-indicator;
comparing the normalized query to one or more previously generated normalized queries to identify a matching query of the one or more previously generated normalized queries, wherein the matching query corresponds to a previously received query comprising one or more second constants;
selecting a matching execution plan of one or more previously saved execution plans, based on the matching execution plan corresponding to the matching query, wherein each of the one or more previously saved execution plans is pre-compiled;

executing the matching execution plan, for the query, on the database, wherein the executing comprises providing the one or more first constants as runtime variables;

generating a result from the execution of the matching execution plan; and returning the result as a result of the query.

9. The system of claim 8, wherein the executing further comprises:

performing a selectivity comparison between the one or more second constants of the previously received query and the one or more first constants of the query;

determining that a first selectivity of the one or more first constants of the query fall within a range of a second selectivity of the one or more second constants of the previously received query; and selecting the matching execution plan based on the determination.

10. The system of claim 8, wherein the executing further comprises:

performing a selectivity comparison between the one or more second constants of the previously received query and the one or more first constants of the query;

determining that a first selectivity of the one or more first constants of the query fall outside a range of a second selectivity of the one or more second constants of the previously received query;

recompiling the matching execution plan in view of the determination; and executing the recompiled matching execution plan.

11. The system of claim 8, wherein the comparing comprises:

comparing a first table of the normalized query to a second table of the matching query to determine that the first table is identical to the second table.

12. The system of claim 11, the operations further comprising:

comparing one or more first fields of the normalized query to one or more second fields of the matching query to determine that the one or more first fields are identical to the one or more second fields.

13. The system of claim 8, wherein the performing normalization comprises:

identifying an OR statement between a first value and a second value in the query;

removing the OR statement; and replacing the first value and the second value with the variable-indicator.

14. The system of claim 8, wherein the performing normalization comprises:

identifying an AND statement between a first field and a second field in the query; and sorting the first field and the second field alphabetically.

15. A non-transitory computer-readable medium having instructions stored thereon that, when executed by at least one computing device, cause the at least one computing device to perform operations comprising:

receiving a query on a database, the query comprising one or more first constants;

performing normalization on the query to generate a normalized query, the normalization comprising replacing the one or more first constants with a variable-indicator;

comparing the normalized query to one or more previously generated normalized queries to identify a matching query of the one or more previously generated normalized queries, wherein the matching query corresponds to a previously received query comprising one or more second constants;

selecting a matching execution plan of one or more previously saved execution plans, based on the matching execution plan corresponding to the matching query, wherein each of the one or more previously saved execution plans is pre-compiled;

executing the matching execution plan, for the query, on the database, wherein the executing comprises providing the one or more first constants as runtime variables;

generating a result from the execution of the matching execution plan; and returning the result as a result of the query.

16. The non-transitory computer-readable medium of claim 15, wherein the executing further comprises:

performing a selectivity comparison between the one or more second constants of the previously received query and the one or more first constants of the query;

determining that a first selectivity of the one or more first constants of the query fall within a range of a second selectivity of the one or more second constants of the previously received query; and selecting the matching execution plan based on the determination.

17. The non-transitory computer-readable medium of claim 15, wherein the executing further comprises:

performing a selectivity comparison between the one or more second constants of the previously received query and the one or more first constants of the query;

determining that a first selectivity of the one or more first constants of the query fall outside a range of a second selectivity of the one or more second constants of the previously received query;

recompiling the matching execution plan in view of the determination; and executing the recompiled matching execution plan.

18. The non-transitory computer-readable medium of claim 15, wherein the comparing comprises:

comparing a first table of the normalized query to a second table of the matching query to determine that the first table is identical to the second table.

19. The non-transitory computer-readable medium of claim 18, the operations further comprising:

comparing one or more first fields of the normalized query to one or more second fields of the matching query to determine that the one or more first fields are identical to the one or more second fields.

20. The non-transitory computer-readable medium of claim 15, wherein the performing normalization comprises:

identifying an OR statement between a first value and a second value in the query;

removing the OR statement; and replacing the first value and the second value with the variable-indicator.

* * * * *